United States Patent [19]

Elton et al.

[11] Patent Number: 4,533,694
[45] Date of Patent: Aug. 6, 1985

[54] FORMULATION FOR ELECTRODEPOSITION OF MICA

[75] Inventors: Richard K. Elton, Altamont; William R. Schultz, Jr., Schenectady, both of N.Y.

[73] Assignee: General Electric Company, Schenectady, N.Y.

[21] Appl. No.: 672,776

[22] Filed: Nov. 19, 1984

Related U.S. Application Data

[63] Continuation-in-part of Ser. No. 555,044, Nov. 25, 1983, abandoned.

[51] Int. Cl.$^3$ .............. C09D 5/40; C25D 13/00; C08K 3/10; C08L 67/02
[52] U.S. Cl. ................... 524/449; 204/181.7; 523/401; 523/402; 523/440; 524/556; 524/612; 524/601; 524/901
[58] Field of Search ............ 524/449, 601, 901, 556, 524/612; 523/401, 402, 440

[56] References Cited

U.S. PATENT DOCUMENTS

| | | | |
|---|---|---|---|
| 2,610,959 | 9/1952 | Nordlander | 524/449 |
| 2,743,309 | 4/1956 | Lindsay et al. | 524/449 |
| 3,702,813 | 11/1972 | Tanaka et al. | 204/181 |
| 3,812,214 | 5/1974 | Markovitz | 525/482 |
| 4,058,444 | 11/1977 | Shibayama et al. | 204/181 F |
| 4,072,536 | 2/1978 | Otsuki et al. | 204/181 C |
| 4,133,787 | 1/1979 | Laganis et al. | 524/605 |
| 4,265,966 | 5/1981 | Schuh | 528/291 |
| 4,337,187 | 6/1982 | Hazan | 204/181 C |
| 4,346,149 | 8/1982 | Sullivan | 524/449 |

FOREIGN PATENT DOCUMENTS

| | | |
|---|---|---|
| 1018088 | 10/1957 | Fed. Rep. of Germany . |
| 52-126438 | 10/1977 | Japan . |
| 53-7737 | 1/1978 | Japan . |
| 53-98337 | 8/1978 | Japan . |
| 54-61700 | 5/1979 | Japan . |
| 54-139952 | 10/1979 | Japan . |
| 55-2047 | 1/1980 | Japan . |
| 56-05868 | 2/1981 | Japan . |
| 56-05867 | 2/1981 | Japan . |
| 57-131267 | 8/1982 | Japan . |
| 1206444 | 9/1970 | United Kingdom . |

*Primary Examiner*—Ronald W. Griffin
*Attorney, Agent, or Firm*—John F. Ahern; Paul Checkovich

[57] ABSTRACT

A composition for electrodeposition of an insulating mica coating onto a conducting substrate is disclosed. The composition consists essentially of mica, a water soluble anionic resin binder, an electrolyte and a polar solvent.

9 Claims, No Drawings

FORMULATION FOR ELECTRODEPOSITION OF MICA

This application is a continuation-in-part of U.S. patent application Ser. No. 555,044 filed Nov. 25, 1983, now abandoned.

FIELD OF THE INVENTION

The present invention relates generally to the art of electrophoretic deposition, and is more particularly concerned with the novel mica containing composition having special utility in providing insulating coatings on electrical conductors.

CROSS REFERENCE

This invention is related to that of patent application, Ser. No. 555,058 filed Nov. 25, 1983 and assigned to the assignee hereof, which discloses and claims a novel process for electrodepositing micaceous coatings on metallic wires, bars and other electrical conductors.

BACKGROUND OF THE INVENTION

The connections in a small dynamoelectric machine are typified by the lengths of bare copper wires which join the stator coils in electric motors. Insulation of those small connections is usually accomplished by application of micaceous insulating tape after the connections are made from a few strands of wire and fastened together, for example, by brazing. Because in many cases, the actual connection is only several inches long, has an irregular geometry and is located in a crowded part of the machine, the insulation normally has to be applied manually, a very slow and laborious process.

In larger machines, such as hydroelectric or steam turbine generators, connections are often made using large copper tubes or bars. These connecting parts may be taped and impregnated prior to installation. In any case, however, because of the irregular shapes involved, much or all the work must be done by hand.

A technique of applying such insulation, without the need for taping, would be of great benefit in the manufacture of dynamoelectric equipment. In addition to the obvious savings in labor and time, the cost of materials would be substantially reduced because insulating tape production involving mica paper fabrication, lamination, etc., would be avoided. Also, less expensive wet ground mica would be used instead of the fluid-split or calcined mica required for tape manufacture.

Heretofore electrodeposition of mica has been a recognized means of providing an electrical insulation coating or covering. Thus, Shibayama et al., U.S. Pat. No. 4,058,444 discloses such a process for providing insulation for coils of rotary machines, mica and a water dispersion varnish being used in a coating bath formulation. Other patents describe the electrophoretic deposition of mica through the use of water dispersion resins in similar manner to bind the deposited mica particles. Japanese patent issued to Mitsubishi Electric Corp. (Japanese Patents Nos. 77 126,438, 81 05,868 and 81 05,867) are directed along this same line, but none of them discloses the in situ electrodeposition of mica on electrical connections.

German Pat. No. 1.018,088 issued to H. W. Rotter describes the use of electrodeposited mica for insulating electrical connections, and sets forth a coating bath formulation which contains extremely finely-divided mica (<1 micron). In addition, the possibility of using a silicone resin emulsion to aid in binding the flakes of mica together is mentioned.

Other applications of electrodeposited mica appear in the patent literature which involve the use of a binder either in the form of a water dispersion polymer or an aqueous emulsion. Objects to be coated such as wires, plates, and perforated plates are mentioned.

None of these prior art procedures has proven to be satisfactory enough to displace the manual technique with all of its drawbacks. For one reason, the coating compositions are unable to withstand prevailing conditions of the manufacturing environment, coalescing or coagulating when agitated or allowed to stand for prolonged periods. Additionally, the emulsions and dispersions used heretofore result in coatings which are not of uniform thickness, particularly on irregularly-shaped conductor substrates because the different levels of electrical field strengths cause corresponding variations in insulating coating thickness.

The generally-recognized, long-standing demand for answers to these problems, having not been met through any of the concepts disclosed in the foregoing patents or elsewhere in the patent art, has persisted to the present time.

SUMMARY OF THE INVENTION

By virtue of the present invention predicated upon our new discoveries and concepts set out below, the shortcomings of the prior art can be avoided and new results and advantages can be obtained. Further, these gains can be made and realized without penalty of offsetting disadvantages of economy or efficiency of production, or of product quality, utility or value.

Our basic new concept is to turn away from prior art practices and attempt a totally different approach to the problem. In essence, our idea is to have the binder in solution in the liquid vehicle of the coating formulation. We have discovered that when such a solution is employed instead of a dispersion or an emulsion, the problem of thick and thin spots in the electro-deposited coatings is substantially eliminated as coatings of substantially uniform thickness are consistently produced. Apparently this is the result of self-limiting effect arising from the fact that depositions on a conductor from a coating bath containing mica and water soluble binder result in the substrate becoming passivated increasingly which in turn results in decay of the deposition rate exponentially with time. We have further found that the decay constant of this system which determines how rapidly this effect develops can be controlled by varying the concentration of water soluble binder and/or electrolyte in the coating bath. Thus areas of the conductor having high field strength will begin to accumulate a heavier coating than the low field regions, but will also become more quickly passivated. The low field strength regions will continue, therefore, to acquire coating at a rate which is greater with respect to the higher field strength regions with the consequence that a much improved coating thickness uniformity is consistently obtained.

Further, in accordance with this basic new concept of ours, the water soluble resin binder must have anionic functionality, that is, only anionic polymers are useful for our purposes and are therefore contemplated by the appended claims. Cationic or nonionic water soluble polymers, unlike anionic-type polymers, are not compatible with mica electrodeposition formulations because they are not attracted to the anode with the mica which in water dispersion acquires a net negative charge.

Water soluble anionic resins which we have found to have special utility in this invention are polyesters, epoxyesters, acrylics and carboxy-terminated butadiene/acrylonitrile resins. It will be understood, however, that others may be used together with or in place of these, and that typically such a resin has an acid number (indicating carboxy group content) from 20 to 120 and that it is rendered water soluble by reaction with a substituted amine or other suitable base. In fact, all the water soluble resin binders which we have used successfully for the purposes of this invention are of that kind.

In practice applying these discoveries and concepts, we have electrodeposited thick coatings of 50 mils or greater thickness of mica-bearing insulation onto conductor substrates, these coatings being of substantially uniform thickness overall in spite of variations of substrate geometry.

Described in broad general terms, the present invention is an electrodeposition composition which consists essentially of 5 to 35 percent particulate mica, 0.2 to 2 percent of water soluble anionic resin binder, as calculated in resin solids, 0.001 to 0.20 percent of electrolyte, and the balance a polar solvent. In terms of preference, the range of mica in the formulation should be from 10 to 16 percent, the resin binder from 15 to 1.5 percent, the electrolyte from 0.002 to 0.05 percent with the solvent being the balance and these percentages, like the others quoted herein, all being on the weight basis.

| Component | Broad Range | Preferred Range |
|---|---|---|
| Mica | 5–35% | 10–16% |
| Soluble Resin Binder (as solids) | 0.2–2% | 0.5–1.5% |
| Electrolyte | 0.001–0.20% | 0.002–0.05% |
| Solvent | Balance | Balance |

DETAILED DESCRIPTION OF THE INVENTION

Within the ranges for mica set forth hereinabove, formulations that produce electrodeposited mica insulations can be made with particulated muscovite, phlogopite, or synthetic fluorophlogopite, although for most applications muscovite is preferred. The mesh size of the mica is important in imparting final properties (dielectric strength, mica content, smoothness, etc.) to the insulation with the preferred range being between 88 to 1000 mesh. The following materials have been successfully electrodeposited to produce an insulation:

1,000 mesh wet ground muscovite
325 mesh wet ground muscovite
160 mesh wet ground muscovite
88 mesh wet ground muscovite
325 mesh phlogopite
1,000 mesh synthetic fluorophlogopite
325 mesh synthetic fluorophlogopite Some of the best results have been achieved with 88 and 325 mesh muscovite, and it is possible to use even small particles as low as 1,000 mesh. All sieve sizes used herein are U.S. Standard. Insulations made from these have good voltage endurance. Wet ground muscovite is significantly less expensive than the thermally processed or fluid-split mica normally used in insulating tapes. Certain grades of phlogopite similarly offer a sizable reduction in cost.

The binders, within the range set forth herein, employed in these formulations are water soluble resins having anionic functionality in solution. Examples of commercial products that are acceptable include:

| Binder | Source |
|---|---|
| Aquanel 600 | Schenectady Chemicals, Inc. |
| Aquanel 513 | Schenectady Chemicals, Inc. |
| Aquanel 550 | Schenectady Chemicals, Inc. |
| Sterling WS79-028 | Sterling Chemicals |
| Sterling WS-200 | Sterling Chemicals |
| Thermelec G-4173 | Ball Chemical Co. |
| Thermelec G-4221 | Ball Chemical Co. |
| Isopoxy-771 | Schenectady Chemicals, Inc. |
| Acrysol WS-68 | Rohm and Haas |
| CBTN | B. F. Goodrich Co. |

The use of water soluble materials is a major part of our invention. Water soluble polyesters, epoxyesters, acrylics, amide-imides, carboxy-terminated butadiene/acrylonitrile and carboxy-terminated polybutadiene resins are advantageous because they are inherently more stable for electrodeposition than suspensions or dispersions used by others. They exhibit long shelf lives in solution and they codeposit solids along with the mica. Thus, as mica is deposited, resin solids are also deposited and serve to bind the mica flakelets together.

A further important feature of such water soluble anionic resins is that, when they deposit solids by electrodeposition, they gradually passivate the conductor surface which thereby results in a decreased rate of coating buildup. The decay constant for such a rate can be controlled easily because it is a function of binder concentration and/or electrolyte concentration. This effect is very significant in obtaining more uniform insulation thicknesses, especially when coating a substrate having an irregular geometry. Irregular shapes usually result in uneven electric field strengths along the surface of the conductor, and, therefore, electrodeposition normally produces thicker or thinner coatings in regions of greater or lesser field strength, respectively. However, when water soluble polymers are used, the extent of variation between these regions can be greatly reduced because the rate of deposition in the regions of higher field strength will begin to decrease early, allowing the lower field strength regions to achieve a heavier deposit than would otherwise occur. Example IV hereinafter demonstrates this effect.

An effective amount of electrolyte is also essential to control the electrophoretic deposition rate. Typically this amount is in the range of 0.001 to 0.2 percent by weight of the total composition.

Careful selection of the electrolyte is necessary for several reasons. Thus, traces of electrolyte in the dried coating must not inhibit or interfere with the curing of the subsequent impregnating resin, the electrolyte must not react to produce gas bubbles during deposition, and the electrolyte must not decrease the stability of the coating formulation.

Many electrolytes have been tried, and from these tests it was found that good results can be obtained by using ammonium nitrate or aluminum acetate. Other electrolytes that may also be used include the following: $NaCl$; $NaHPO_4$; $Mg(C_2H_3O_2)_2$; $Na_2SO_4$; $KCl$; $(NH_4)_2SO_4$; etc.

In most cases, distilled or deionized water is quite acceptable. Also, some polar solvents other than water will work, as for example, methanol, ethanol, or mixtures of these with water.

In general, the pH of the formulation may be in the range of from 5.5 to 9.0. Preferably, however, the pH should not be below 7.0. It is not generally controlled, but the pH should not drop below 5.5 to ensure stability of the anionic resin binder.

Our invention is further illustrated by the following examples in which all mesh is given in U.S. Standard sieve sizes and all percentages are given in weight percent.

EXAMPLE I

A formulation of the coating composition of the present invention was prepared by mixing the following ingredients: 5,600 grams of 88 mesh muscovite mica powder available from Franklin Minerals, Inc., 560 grams Aquanel 513 water soluble insulating varnish available from Schenectady Chemicals, Inc. (28% solids of an oil modified polyester), 2.5 grams sodium chloride, and enough distilled water to bring the bath volume up to 34 liters.

A rectangular copper wire, $0.162'' \times 0.322''$ cross section, was immersed in the coating formulation coaxial with respect to a 3 inch copper tube at ground potential. Mica and binder were electrodeposited on the wire by applying an anodic potential of 60 volts d.c. for 80 seconds. The coated wire was removed from the bath and dried at 25° C. for 15 hours, and the binder cured at 165° C. for 4 hours, resulting in a porous micaceous coating.

Thereafter, the coating was vacuum/pressure impregnated with an epoxy resin consisting of 60% cycloaliphatic and 40% Bisphenol A epoxy, as disclosed in Markovitz, U.S. Pat. No. 3,812,214. The epoxy was cured for 6 hours at 160° C. to yield a consolidated, void-free insulation 30 mils thick containing 40.4% mica. The insulation was voltage endurance tested by wrapping the insulated wire spirally with a 40 mil bare Cu wire and applying 7,500 volts at 60 Hz. The insulation survived the corona and voltage stress for 5,035 hours.

EXAMPLE II

Following the procedure of Example I, a formulation was prepared using 5,600 grams of mesh wet ground muscovite mica powder available from Concord Mica Company, 560 grams Aquanel 513 water soluble insulating varnish, 1.0 grams sodium chloride, and enough distilled water to bring the bath volume up to 32 liters.

A rectangular wire was immersed as disclosed in Example I, and mica was deposited by applying an anodic potential of 60 volts dc to the wire for 60 seconds. Thereafter, the wire was dried, baked, and vacuum/pressure impregnated as disclosed in Example I.

The resulting insulation was 28 mils thick and contained 41.4% mica. When voltage endurance tested as described in Example I, the insulation withstood 3,236 hours.

EXAMPLE III

A formulation of the coating composition of the present invention was prepared by mixing the following ingredients in a two-gallon tin coated steel container: 900 grams of 325 mesh muscovite mica powder as recited in Example II, 170 grams of a water soluble polyester resin varnish available as Sterling WS-200 WAT-A-VAR from Reichold Chemicals, Inc., 2 grams of ammonium nitrate, and enough distilled water to bring the volume up to 2 gallons.

Thereafter, the formulation was stored with a loose cover lid for a period of five months at 25° C.

Following this shelf life exposure test the bath was agitated gently with a paddle. An object consisting of two rectangular copper strips, overlapping each other by ½ inch and brazed together, bent in the shape of a U, and insulated with conventional mica tapes on the ends only was immersed in the bath. Using the container as ground, an anodic potential of 60 volts dc was applied for 350 seconds to deposit mica and binder. Thereafter, the object was dried 15 hours at 25° C. and baked 6 hours at 160° C. It was subsequently vacuum/pressure impregnated with an accelerated version of the epoxy resin disclosed in Example I and cured 6 hours at 160° C.

The result was a uniform insulation 125 mils thick and overlapping the conventionally taped insulation by about 120 mils. The mica content was 36.9%. When the interface between the electrodeposited mica and the conventional insulation was wrapped with a 2 inch metal foil, over 35,000 volts at 60 Hz was applied between the copper strips and foil without failure.

The example attests to the excellent shelf life of these formulations in ordinary unsealed containers as well as the high dielectric strength of the resulting insulation.

EXAMPLE IV

Following the procedure of Example I, a formulation was prepared consisting of 900 grams of 325 mesh muscovite powder, 200 grams of Aquanel 513 water soluble polyester varnish, 2 grams ammonium nitrate, diluted to 2 gallons with distilled water and stored in a tin coated steel container.

A test sample was prepared from two parallel copper bars, having rectangular cross sections of $1 \text{ inch} \times \frac{1}{4}$ inch, and 6 inches in length. The bars were separated by two ⅜ inch thick phenolic spacers placed at either end of the bars and the bars were bolted together. The sample was then immersed in the coating formulation. Mica and binder were deposited thereon by applying an anodic potential of 100 volts dc for a time of 400 seconds. The metal container was grounded and became the cathode of the electrical deposition system. The bars were removed and dried 15 hours at 25° C., then 6 hours at 105° C., and finally 6 hours at 160° F. Thereafter, the bars were vacuum/pressure impregnated with an accelerated version of the epoxy resin disclosed in Example I, and the resin cured at 160° C. for 6 hours. The resulting insulation measured 130–137 mils thick on the outside faces of the bars and 102–107 mils on the inner faces. This represents a reduction in insulation thickness of only about 15% in the electrically shielded region.

This example demonstrates how an improved uniformity of insulation build can be achieved in regions where electrical shielding or enhancement occurs simply by adjusting the concentration of water soluble binder.

As a comparison, the same copper bar configuration immersed in a bath containing the same constituents as in Example IV and 100 grams of Aquanel 513 instead of 200 grams results in insulation builds of 252 mils and 85 mils on the outer and inner faces, respectively. Here, a reduction in thickness of 66% occurs in the shielded region.

EXAMPLE V

Following the procedure of Example I, a formulation was prepared containing 900 grams of 325 mesh phlogopite mica powder available from Martin Marietta, Inc., 170 grams of a water soluble polyester varnish available as Sterling WS79-028 WAT-A-VAR from Reichold Chemicals, Inc., and 2 grams of ammonium nitrate diluted to a volume of 2 gallons with distilled water in a metallic vessel.

Copper wire substrates similar to Example I, were immersed in the coating formulation and an anodic potential of 60 volts dc applied for 180 seconds, keeping the metallic container at ground. The bars, coated with mica and resin, were removed and dried for 18 hours at 25° C. and then cured for 4 hours at 170° C.

Thereafter, the coated wires were vacuum/pressure impregnated with an accelerated version of the epoxy resin disclosed in Example I, and the resin cured for 6 hours at 160° C. The final insulation had a uniform build-up of about 95 mils and contained 38% mica.

EXAMPLE VI

Following the procedure of Example I, a formulation was prepared containing 5,600 grams of 325 mesh muscovite mica powder, 560 grams of Aquanel 513 water soluble polyester resin, 17.5 grams basic aluminum acetate (stabilized with boric acid), and enough distilled water to bring the volume up to 34 liters.

A copper object having an irregular tubular structure was immersed in the bath during agitation, and mica and binder were deposited on it by applying an anodic potential of 60 volts dc for 180 seconds. Simultaneously, an immersed metal sheet was kept at ground potential to serve as cathode. The object was dried 18 hours at 25° C. and cured 6 hours at 170° C.

Thereafter, the object was vacuum/pressure impregnated as disclosed in Example I. The resulting insulation had a uniform thickness of about 100 mils and contained 35% mica.

A summary table showing the percentages in weight for the compositions of the above Examples is as follows:

TABLE I

|  | Ex. I | Ex. II | Ex. III | Ex. IV | Ex. V | Ex. VII |
|---|---|---|---|---|---|---|
| Mica | 14.85 | 15.69 | 11.00 | 11.09 | 11.00 | 14.85 |
| Binder | 1.49 | 1.57 | 2.07 | 2.46 | 2.07 | 1.49 |
| (Resin Solids) | (0.50) | (0.52) | (0.83) | (0.82) | (0.83) | (0.50) |
| Electrolyte | 0.0066 | 0.002 | 0.024 | 0.025 | 0.024 | 0.046 |
| Distilled Water | 83.65 | 82.74 | 86.89 | 86.42 | 86.89 | 83.62 |

EXAMPLE VII

In order to compare the effects of using water soluble resins versus water dispersed resins in the electrodeposition of mica, test samples of two parallel copper bars (designated as bar X and bar Y) were prepared having the dimensions and configuration as described in Example IV. Electrodeposition baths were prepared consisting of 2 pounds of 325 muscovite, 2 grams of ammonium nitrate, 114 grams (on a solid basis) of resin and two gallons of distilled water.

The resin systems compared in the above formulation were as shown in the following table. In the subsequent discussion and tabulation of th experimental results, the electrodeposited samples are identified by the designation of the resin system used.

TABLE II

Resin System

A. Water Soluble Resins

- A1. Aquanel 513, a water soluble polyester, commercially available from Schenectady Chemical Company.
- A2. Aquanel 550, a water soluble polyester, commerically available from Schenectady Chemical Company.
- A3. GE 111-244, a water soluble polyester, available from General Electric Company.

B. Water Dispersion Resins

- B1. Rhoplex TR-407, an acrylic dispersion resin, commercially available from Rohm and Haas Company.
- B2. Rhoplex AC-1533, an acrylic dispersion resin, commercially available from Rohm and Haas Company.
- B3. Rhoplex AC-1822, an acrylic dispersion resin, commercially available from Rohm and Haas Company.
- B4. Cavalite, an acrylic dispersion resin, commercially available from E. I. DuPont De Nemours and Company.

Mica and binder were electrodeposited on the wire by applying an anodic potential of 80 volts dc for a time of 180 seconds with the exception that the time in sample B2 was 130 seconds and the sample B4 was 120 seconds.

In all cases the outer coating was thicker than the inside coating, due to an electrical shielding effect. In the case of water soluble resin coatings, improved thickness uniformity between the inside and the outside as indicated by the ratio of I/O resulted. Water dispersion resins, on the other hand were much more influenced by the electrical shielding effect as indicated by a significantly lower ratio of I/O.

The results are shown in the following table:

TABLE III

| Resin System | Bars | Inside Thickness, I (mils) | Outside Thickness, O (mils) | Ratio I/O |
|---|---|---|---|---|
| A. Water Soluble Resins | | | | |
| A1. Aquanel 513 | X | 70 | 98 | .71 |
|  | Y | 78 | 99 | .79 |
| A2. Aquanel 550 | X | 57 | 98 | .58 |
|  | Y | 60 | 98 | .61 |
| A3. GE 111-244 | X | 80 | 102 | .78 |
|  | Y | 88 | 112 | .79 |
| B. Water Dispersion Resin | | | | |
| B1. Rhoplex TR-407 | X | 19 | 49 | .39 |
|  | Y | 19 | 52 | .37 |
| B2. Rhoplex AC-1533 | X | 42 | 135 | .31 |
|  | Y | 48 | 120 | .40 |
| B3. Rhoplex AC-1822 | X | 45 | 105 | .43 |
|  | Y | 54 | 115 | .47 |
| B4. Cavalite | X | * | * | * |
|  | Y | * | * | * |

*Coating did not adhere to test bars and no measurements were possible.

Similar test bars to those used in the thickness test were also prepared, and subjected to a rinse under running water from a faucet. Sample A1, A2 and A3 remained adherent to the bars. Sample B4 could not be evaluated since it had insufficient adhesion to the bar. Sample B3 washed off easily. Samples B1 and B2 washed off partially, leaving exposed portions of copper, and reduced coating thicknesses in other places.

EXAMPLE VIII

The utility of epoxyesters in accordance with this invention was tested by preparing a one gallon aqueous bath of the following ingredients:
1 lb. of 325 mesh mica
110 grams Isopoxy 771 (Schenectady Chemicals)
1 gram $NH_4NO_3$
2 grams Tergitol NP10 surfactant A copper bar was immersed in this bath at room temperature and maintained at +60 volts for 240 seconds whereupon the bar was removed, dried 24 hours at 25° C. and then baked 6 hours at 160° C. The bar was then impregnated by vacuum pressure impregnation technique with an epoxy resin and then baked at 160° for 6 hours to cure the epoxy resin. The result was found to be a uniform coating of about 0.210 inch and was void free and of mica content approximating 40 percent. Thus, this coating compared favorably with that produced as described above in Example I.

EXAMPLE IX

The suitability of acrylics was similarly tested in another experiment in which a two gallon aqueous bath was prepared by adding the following to water:
2 lbs. of 325 mesh mica
360 grams Acrysol WS-68 acrylic resin (Rohm and Haas)
4 grams Tergitol NP10 surfactant
2 grams Sodium Lauryl sulfate
2 grams Dimethylaminoethanol Again, a copper bar was immersed in this bath and held at +60 volts for 300 seconds whereupon the bar was removed and treated as in Example VIII with the consequence that a coating of uniform thickness approximating 0.200 inch was produced having a mica content of about 40 percent and being void free and comparing again favorably with the insulating coating described above in Example I.

EXAMPLE X

A one gallon aqueous bath was prepared by adding the following to water:
1 lb. of 325 mesh mica
65 grams Carboxy-terminated butadiene/acrylonitrile (B. F. Goodrich)
2 grams $NH_4NO_3$
2 grams Tergitol NP10
1 gram Sodium Lauryl sulfate This, thus, was a test of the suitability in accordance with this invention of the so called CTBN resins which are as described above blended in 65 grams of butyl cellosolve and reacted with 4.6 grams dimethylaminoethanol. As in Examples VIII and IX, a copper bar was immersed in this bath and held at 45 volts for 150 seconds then removed and processed as described in Example VIII with the result that a uniform coating of about 0.12 inch thickness resulted. This insulating coating was found to be void free and to have a mica content approximating 40 percent and to be therefore quite similar to those of Example I, VIII and IX above.

EXAMPLE XI

To test the suitability of combinations of these anionic water soluble resins for the purposes of this invention, a four gallon aqueous bath was prepared by adding Acrysol WS-68 and Aquanel 513 in a ratio to each other about 1.5 to 1, the actual formulation being as follows:
480 grams Acrysol WS-68 acrylic resin
340 grams Aquanel 513 polyester resin
8 grams Tergitol NPID
4 grams Sodium Lauryl Sulfate
8 grams Dimethyl-amino-ethanol
5 grams Ammonium Nitrate and the balance water.

Once again, the copper bar test as described in Example VIII was carried out with successful results in terms of the resulting insulating coating being of uniform thickness approximating 0.21 inch and of mica content approximating 40 percent and being void free and altogether a superior electrical insulating coating of the sort described above in Example I.

EXAMPLE XII

The utility of non-ionic polymer in this invention was tested in an experiment involving the use of
1 lb. of 325 mesh mica
75 grams of polyethyleneglycol (average mica weight 6,000)
1 gram of ammonium nitrate The mixture was added to one gallon of water and a copper bar test was run as described above in Examples VIII–XI. Thus, the copper bar was immersed in this bath and a potential of 60 volts DC was applied for about one minute the bar being then removed and found to be completely clean. There was no mica adherence to the bar at all and the polymer was found of itself to be insufficient to hold the mica particles together.

EXAMPLE XIII

The suitability of a cationic polymer was similarly tested in experiments which involved formulation of
1 lb. of 325 mesh mica
2 grams of $NH_4NO_3$
80 grams of Poly-2-vinylpyridine dissolved in 80 milliliters of butyl cellosolve
20 grams of acetic acid The mixture was prepared in a volume of one gallon with water and agitated for 30 minutes in a paint shaker to allow the ingredients to disperse and the acid to react with the Poly-2-vinylpyridine to form a polyelectrolyte. Then two copper strips were immersed in the bath spaced about two inches apart, the potential of 60 volts DC was applied to the strips. Immediately mica was observed to begin accumulating about the anode while at the cathode a gelatinous accumulation was observed. After 60 seconds, the voltage was dropped to zero and the strips were removed. The mica deposit at the anode having no binder slipped off the wire and could not be removed from the bath, thus demonstrating the generic inability of cathotic deposition resins to bind or hold material deposited at the anode.

The data obtained from these tests substantiate the fact that in electrodeposition of mica improved results can be obtained using anionic water soluble resins as compared to water dispersion resins and to non-ionic and cationic water soluble resins.

It will be appreciated that the invention is not limited to the specific details whown in the illustrations and that various modifications may be made within the ordinary skill in the art without departing from the spirit and scope of the invention.

What is claimed is:

1. An electrodeposition composition consisting essentially in weight percent of 5 to 35% of particulated mica, 0.2 to 2% of a water soluble anionic resin binder as calculated in resin solids, 0.001 to 0.20% of electrolyte, and the remainder a polar solvent.

2. The composition of claim 1 wherein said mica has a particle size of 88 to 1,000 mesh U.S. Standard.

3. The composition of claim 2 consisting essentially in weight percent of 10 to 16% mica, 0.5 to 1.5% in resin solids of binder, 0.02 to 0.05% of electrolyte, and the remainder a polar solvent.

4. The composition of claims 1 or 3 wherein said polar solvent is substantially water.

5. The composition of claim 4 wherein said binder is a water soluble polyester.

6. The composition of claims 1 or 3 wherein said mica is a member selected from the group consisting of muscovite, phlogopite and fluorophlogopite.

7. The composition of claims 1 or 3 wherein said electrolytes are selected from the group consisting of ammonium nitrate, sodium chloride, potassium chloride, sodium phosphate, aluminum acetate, sodium sulfate, ammonium sulfate, and mixtures thereof.

8. The composition of claim 4 consisting in weight percent of about 11.0 mica, 0.83% in resin solids of binder, 0.024% electrolyte and 86.89% water.

9. The composition of claim 1 in which the water soluble anionic resin binder is selected from the group consisting of polyesters, epoxyesters, acrylics, amide-imides, carboxy-terminated butadiene/acrylonitriles, carboxy-terminated polybutadiene resins and mixtures thereof.

* * * * *